United States Patent
Carrier et al.

(10) Patent No.: US 11,481,442 B2
(45) Date of Patent: Oct. 25, 2022

(54) LEVERAGING INTENT RESOLVERS TO DETERMINE MULTIPLE INTENTS

(71) Applicant: INTERNATIONAL BUSINESS MACHINES CORPORATION, Armonk, NY (US)

(72) Inventors: Scott Carrier, Apex, NC (US); Brendan Bull, Durham, NC (US); Paul Lewis Felt, Springville, UT (US); Dwi Sianto Mansjur, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 16/711,500

(22) Filed: Dec. 12, 2019

(65) Prior Publication Data

US 2021/0182339 A1    Jun. 17, 2021

(51) Int. Cl.
  *G06F 16/9032* (2019.01)
  *G06F 40/295* (2020.01)
  *G06F 40/35* (2020.01)
(52) U.S. Cl.
  CPC ...... *G06F 16/90332* (2019.01); *G06F 40/295* (2020.01); *G06F 40/35* (2020.01)
(58) Field of Classification Search
  CPC ... G06F 16/90332; G06F 40/35; G06F 40/295
  See application file for complete search history.

(56) References Cited

U.S. PATENT DOCUMENTS

| | | |
|---|---|---|
| 7,596,568 B1 | 9/2009 | McConnell |
| 9,495,962 B2 | 11/2016 | Govrin |
| 10,839,432 B1 | 11/2020 | Konig |
| 2015/0348549 A1 | 12/2015 | Giuli |
| 2016/0342702 A1 | 11/2016 | Barve |
| 2017/0069310 A1* | 3/2017 | Hakkani-Tur .......... G06F 40/35 |
| 2017/0075988 A1 | 3/2017 | Kadiri |
| 2018/0157721 A1 | 6/2018 | Khaitan |
| 2018/0233138 A1 | 8/2018 | Talwar |
| 2018/0233141 A1 | 8/2018 | Solomon |
| 2018/0358001 A1 | 12/2018 | Amid |
| 2019/0147044 A1 | 5/2019 | Bangalore |

(Continued)

FOREIGN PATENT DOCUMENTS

KR         101891498 B1      9/2018

OTHER PUBLICATIONS

Github-Rasahq/tutorial-tf-pipeline: "Handling Multiple intents using Rasa NLU TensorFlow Pipeline", https://github.com/RasaHQ/tutorial-tf-pipeline, printed Sep. 16, 2019, pp. 1-2.

(Continued)

*Primary Examiner* — Sonia L Gay

(74) *Attorney, Agent, or Firm* — Alexis N. Hatzis

(57) ABSTRACT

The exemplary embodiments disclose a system and method, a computer program product, and a computer system for determining the intents of user expression. The exemplary embodiments may include receiving a user expression, extracting one or more entities from the user expression, gathering one or more resolvers associated with the one or more entities, identifying a first resolver of the one or more resolvers based on the user expression and the one or more training expressions, and resolving the first resolver to generate a first output.

20 Claims, 7 Drawing Sheets

(56) References Cited

U.S. PATENT DOCUMENTS

| | | |
|---|---|---|
| 2019/0164064 A1 | 5/2019 | Li |
| 2019/0188590 A1 | 6/2019 | Wu |
| 2020/0201940 A1 | 6/2020 | Nelson |
| 2020/0278842 A1* | 9/2020 | Shihab .................... G06F 40/30 |
| 2021/0165540 A1 | 6/2021 | Araki |
| 2021/0182340 A1 | 6/2021 | Carrier |

OTHER PUBLICATIONS https://docs.meya.ai/docs/handle-multiple-intents-in, "Join GitHub Today", printed Sep. 16, 2049, pp. 1-2.

Mell et al., "The NIST Definition of Cloud Computing", National Institute of Standards and Technology, Special Publication 800-145, Sep. 2011, pp. 1-7.

Petraityte, "How to Handle Multiple Intents Per Input Using RASA NLU TensorFlow Pipeline", https://blog.rasa.com/how-to-handle-multiple-intents-per-input-using-rasa-nlu-tensorflow-pipeline/, Jun. 11, 2018, pp. 1-16.

Springer, "Two-Stage Multi-Intent Detection for Spoken Language Understanding", Multimedia Tools and Applications, https://link.springer.com/article/10.1007/s11042-016-3724-4, May 2017, vol. 76, Issue 9, pp. 11377-11390.

Xu et al., "Exploiting Shared Information for Multi-Intent Natural Language Sentence Classification", https://www.semanticscholar.org/paper/Exploiting-shared-information-f . . . , Published in INTERSPEECH 2013, pp. 1-7.

IBM, List of IBM Patents or Patent Applications Treated as Related, Appendix P, dated Dec. 27, 2019, 2 pages.

Pending U.S. Appl. No. 16/711,507, filed Dec. 12, 2019, entitled: "Resolving User Expression Having Dependent Intents ", 39 pages.

* cited by examiner

LEVERAGING INTENT RESOLVERS TO DETERMINE MULTIPLE INTENTS

BACKGROUND

The exemplary embodiments relate generally to determining user intents, and more particularly to determining user intents of a user expression having multiple embedded and—dependent intents.

Humans often communicate with automated computers or machines, such as automated phone call answering machines, smart speakers, smart assistants, and the like. In practice, it may be difficult for automated computers or machines to adequately respond to humans or adequately fulfill their requests without understanding their intentions. In order to understand human intentions, it is often necessary to understand the intents of human inputs and expression, such as a message, command, question, and the like. Moreover, often times such human expression may include multiple intents, and such intents may be dependent on the resolving of other intents within the human inputs. It is therefore necessary to determine each of the intents of human expression to adequately understand and respond to human prompts.

SUMMARY

The exemplary embodiments disclose a system and method, a computer program product, and a computer system for determining the intents of user expression. The exemplary embodiments may include receiving a user expression, extracting one or more entities from the user expression, gathering one or more resolvers associated with the one or more entities, identifying a first resolver of the one or more resolvers based on the user expression and the one or more training expressions, and resolving the first resolver to generate a first output.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
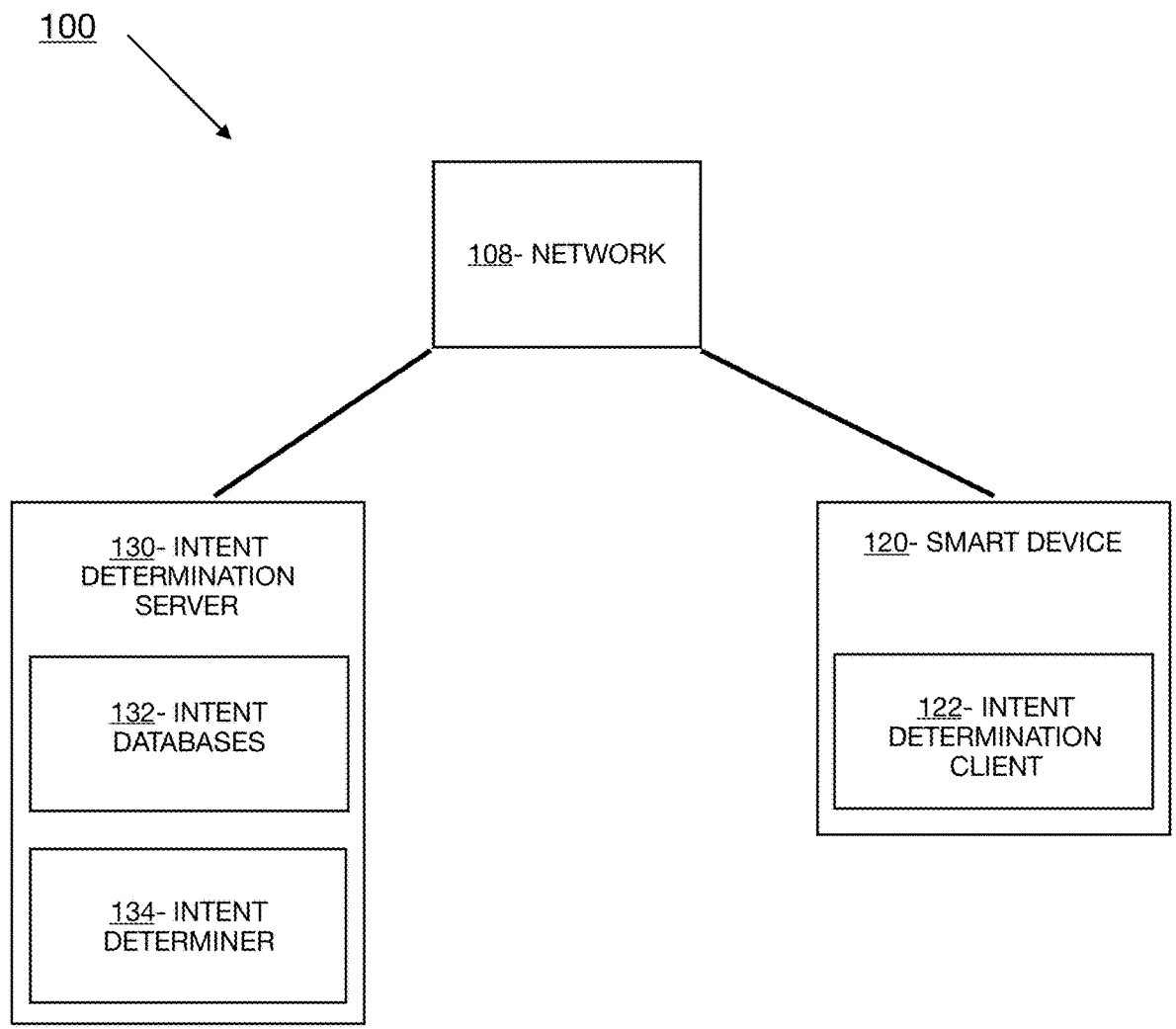
FIG. 1 depicts an exemplary schematic diagram of an intent determination system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Humans often communicate with automated computers or machines, such as automated phone call answering machines, smart speakers, smart assistants, and the like. In practice, it may be difficult for automated computers or machines to adequately respond to humans or adequately fulfill their requests without understanding their intentions. In order to understand human intentions, it is often necessary to understand the intents of human inputs and expression, such as a message, command, question, and the like. Moreover, often times such human expression may include multiple intents, and such intents may be dependent on the resolving of other intents within the human inputs. It is therefore necessary to determine each of the intents of human expression to adequately understand and respond to human prompts.

Exemplary embodiments described herein provide a means for generating a dependency graph resolution of a set of intent resolvers for multi-intent messages, featuring embedded questions, in which one or more resolver inputs are not directly satisfied by a canonical text, but rather the output of one of the other resolvers. Dependency graph resolution comes into play when satisfying resolver inputs for multiple intents over a message is based on a specific order of execution for the intent resolvers.

Multi-intent messages with embedded questions are oftentimes associated with messaging/chat solutions in which questions can be formulated to build upon other questions. Thus, instead of having to pose multiple questions to the system, a user can phrase questions such that portions of the questions can be based on answers to other questions within the same user expression. Such techniques improve existing AI systems by increasing an efficiency at which it acquires the desired information. As used herein, an "intent resolver" can refer to any process or routine with inputs and outputs that execute or process a particular intent or intents.

Accordingly, exemplary embodiments are directed to a method, computer program product, and computer system for resolving a multi-intent statement having multiple embedded and dependent intents. Exemplary embodiments may utilize entities and associated classes, inputs/outputs, and functions known as resolvers in order to resolve each of the embedded intents and overall user intent. Use cases of the exemplary embodiments include automated call answering machines, smart devices, smart assistants, etc. In general, it will be appreciated that embodiments described herein may relate to aiding in the determination of the intents of user expression within any environment.

FIG. 1 depicts the intent determination system 100, in accordance with the exemplary embodiments. According to the exemplary embodiments, the intent determination system 100 may include a smart device 120 and an intent determination server 130, which may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the intent determination system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the example embodiment, the smart device 120 includes an intent determination client 122, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 5, as part of a cloud implementation with reference to FIG. 6, and/or as utilizing functional abstraction layers for processing with reference to FIG. 7.

The intent determination client 122 may be a software and/or hardware application capable of communicating with and providing a user interface for a user to interact with a server via the network 108. The intent determination client 122 may act as a client in a client-server relationship. Moreover, in the example embodiment, the intent determination client 122 may be capable of transferring data between the smart device 120 and other devices via the network 108. In embodiments, the intent determiner 134 utilizes various wired and wireless connection protocols for data transmission and exchange, including Bluetooth, 2.4 gHz and 5 gHz internet, near-field communication, Z-Wave, Zigbee, etc. The intent determination client 122 is described in greater detail with respect to FIG. 2.

In the exemplary embodiments, the intent determination server 130 includes one or more intent databases 132 and an intent determiner 134. The intent determination server 130 may act as a server in a client-server relationship with the intent determination client 122, and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the intent determination server 130 is shown as a single device, in other embodiments, the intent determination server 130 may be comprised of a cluster or plurality of computing devices, working together or working independently. The intent determination server 130 is described in greater detail as a hardware implementation with reference to FIG. 5, as part of a cloud implementation with reference to FIG. 6, and/or as utilizing functional abstraction layers for processing with reference to FIG. 7.

In the exemplary embodiments, the intent databases 132 may be a collection of organized data which details information associating one or more user expressions, entities, classifications, resolvers, resolver input/output classes, and intents. As used herein, a user expression, such as an action, question, statement, etc., may include one or more abstract or physical entities such as persons, organizations, locations, products, ideas, etc. For example, a user input inquiring "does aspirin treat a headache?" includes the entities aspirin and headache. Each entity may be further associated with a class describing a category of the entity. For example, aspirin may be associated with the class "medication", denoted aspirin [medication], and headache may be associated with the class "symptom", denoted headache [symptom]. Moreover, the one or more entities and one or more classes may be further associated with one or more functions known as resolvers. In embodiments, the resolvers may resolve a query associated with an entity. For example, entities classified as a [medication] may be associated with the resolver "medTreats" that functions to determine which condition class entities the medication entity treats. The resolvers may be further associated with natural language training sentences associated with the resolver function. For example, the resolver "medTreats" may be associated with the natural language training sentence "what [condition] does [medication] treat?" Lastly, resolvers may be associated with specific input classes and output classes defining which kinds of information each resolver may receive as input and generate as an output. Exemplary information stored within the intent databases 132 are illustrated by Table 1 illustrates, below. In some embodiments, the intent databases 132 may additionally include vectors, graphs, or other visual representations of data, such as vectors to be analyzed with cosine similarity models or bar graphs to be analyzed with bag of words models. In the example embodiment, the intent databases 132 is stored remotely on the intent determination server 130. In other embodiments, however, the intent databases 132 may be stored elsewhere, such as locally on the smart device 120. The intent databases 132 are described in greater detail with respect to FIG. 2.

TABLE 1

Additional Example Resolvers

| Resolver | Input Class | Output Class | Training Phase |
| --- | --- | --- | --- |
| getConditionSymptoms | [condition] | [symptoms] | "What are the [symptoms]of [condition]?" |
| getConditionMeds | [condition] | [medication] | "What [medications] are used to treat [condition]?" |
| getMedSideEffects | [medication] | [side_effect] | "What are the [side_effects] of [medication]?" |
| getMedCost | [medication] | [cost] | "How much does [medication] [cost]?" |
| getMedForSideEffects | [side_effect] | [medication] | "What [medications] are used to treat [side effect]?" |
| getMedForCondition | [condition] | [medication] | "What [medications] are used to treat [condition]?" |
| getSideEffectOTCMeds | [side_effect] | [otc_meds] | "What [otc_meds] are used to treat [side_effect]?" |

The intent determiner 134 may be a software and/or hardware program capable of receiving a user expression, extracting one or more entities from the user expression, gathering one or more resolvers associated with the one or more entities, identifying a first resolver of the one or more resolvers based on the user expression and the one or more training expressions, and resolving the first resolver to generate a first output. The intent determiner 134 is described in greater detail with reference to FIG. 2.

Figure 2:
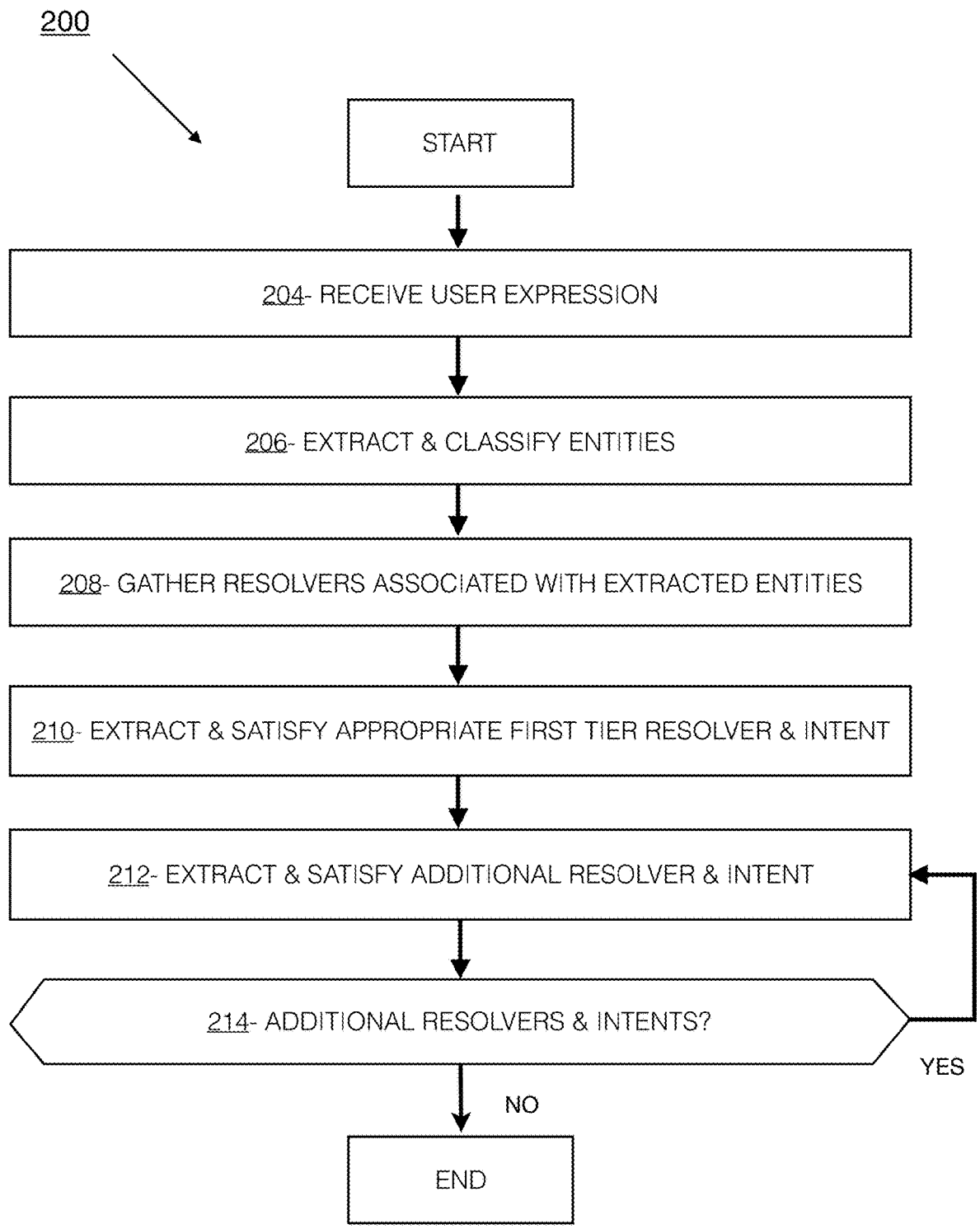
FIG. 2 depicts an exemplary flowchart 200 illustrating the operations of an intent determiner 134 of the intent determination system 100 in determining the intents of one or more user expressions, in accordance with the exemplary embodiments.

FIG. 2 depicts an exemplary flowchart 200 illustrating the operations of an intent determiner 134 of the intent determination system 100 in determining user intents, in accordance with the exemplary embodiments.

The intent determiner 134 may collect or receive data relating to user expression (step 204). User expression may include natural language, body/gestural language, sign, language, facial expression, text, etc., and may be communicated to the intent determiner 134 via the intent determination client 122 in the form of audio, video, image, message, etc. In embodiments, the user expression may comprise one or more words, one or more sentences, one or more paragraphs, etc. When receiving user expression in the form of text, the intent determiner 134 may receive and process the textual user expression using natural language processing and machine learning techniques. When receiving the user expression in the form of spoken natural language, the intent determiner 134 may extract, translate, transcribe, process, etc. the spoken natural language before processing the user expression as text, as described above. When receiving user expression in the form of gestural language, sign language, facial expression, or other visual expression, the intent determiner 134 may implement image and video analysis techniques in combination with referential databases in order to extract user expression. In further embodiments, additional means of user expression and user expression extraction may be contemplated.

Figure 3:
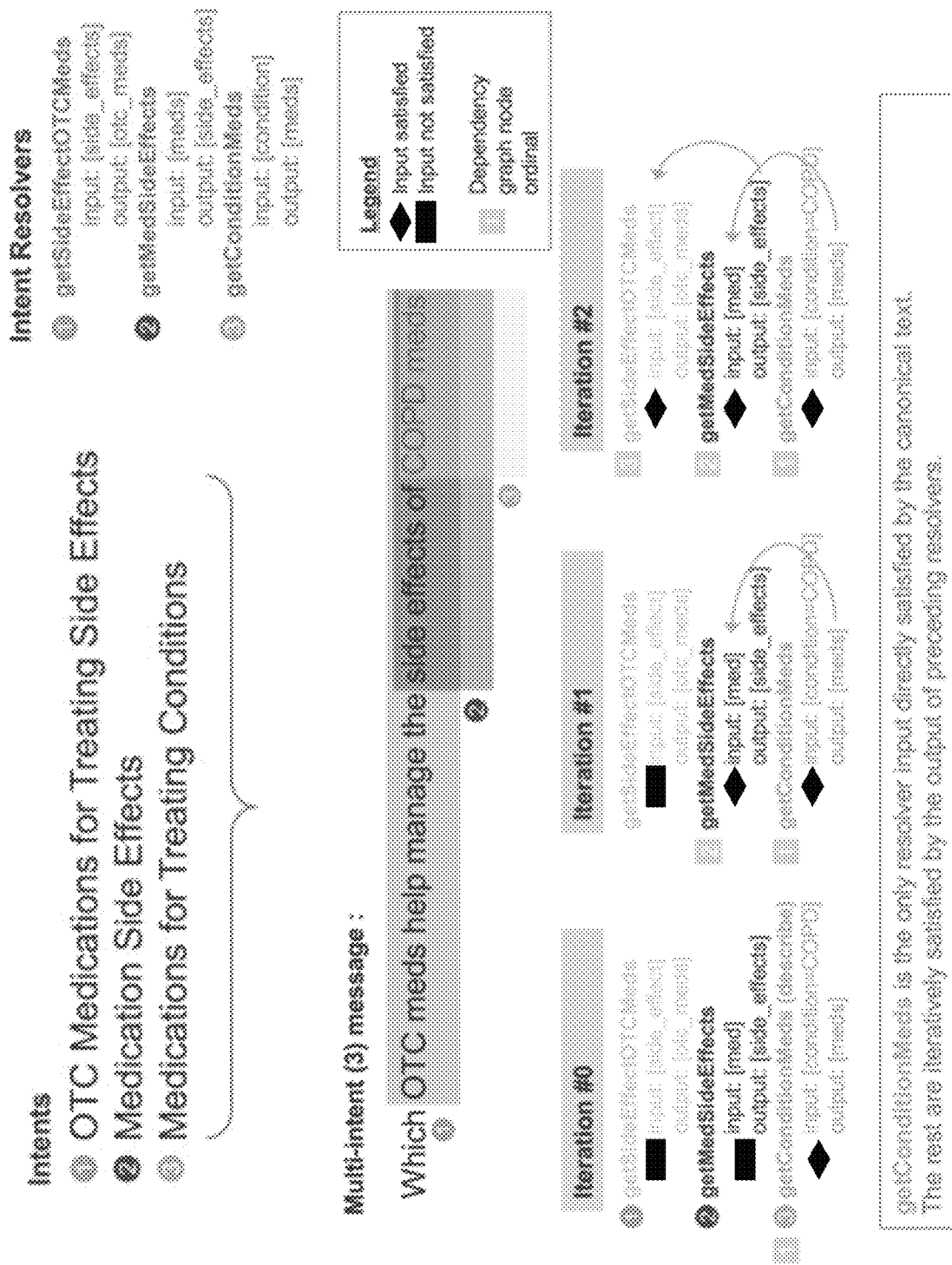
FIG. 3 depicts an illustrative example of the intent determination system 100 resolving a user expression, in accordance with the exemplary embodiments.
Figure 4:
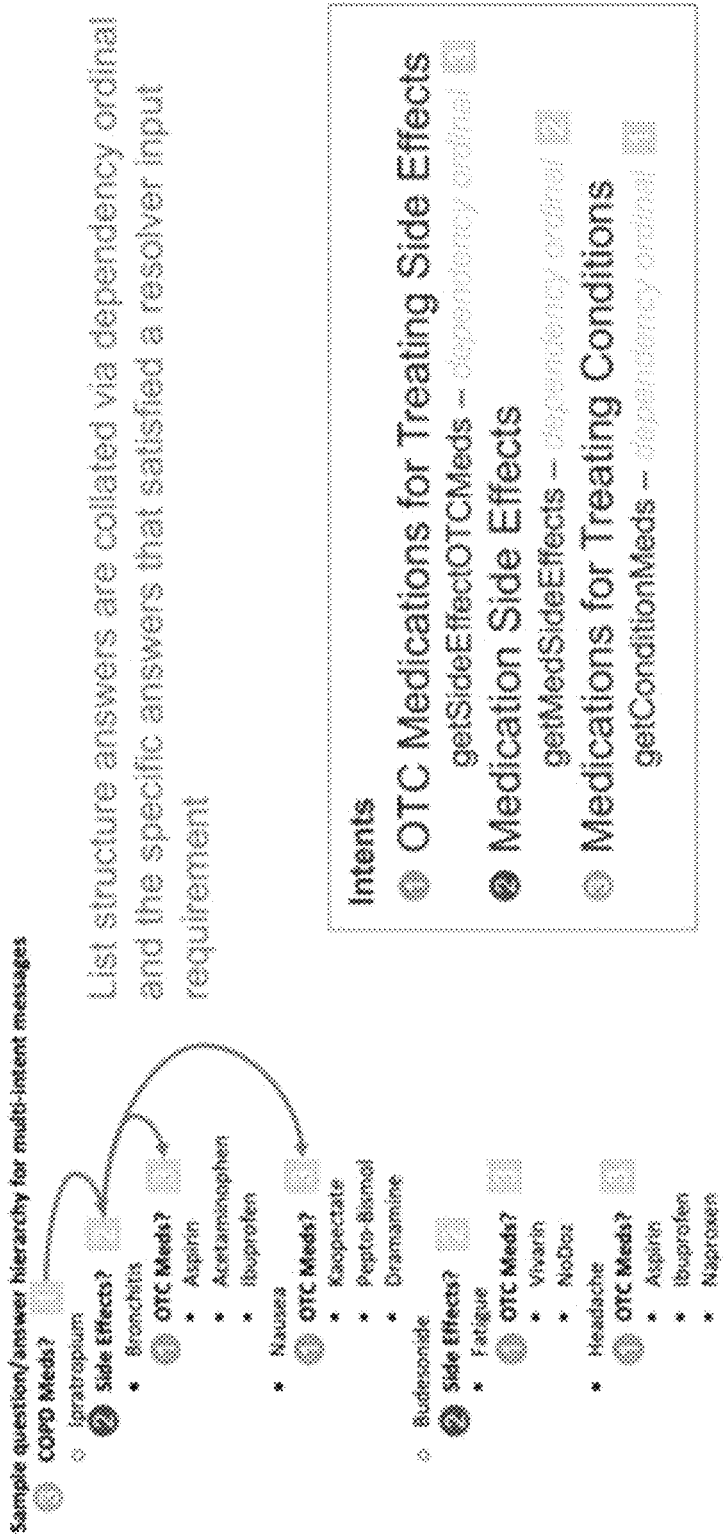
FIG. 4 depicts an illustrative example of an intent resolver dependency graph generated by the intent determination system 100 in resolving the user expression of FIG. 3, in accordance with the exemplary embodiments.

To further illustrate the operations of the intent determiner 134, reference is now made to FIG. 3-4 which depict an illustrative example where the intent determiner 134 receives the user expression: "Which over the counter medications help manage the side effects of COPD medications?"

The intent determiner 134 may extract and classify one or more entities from the collected or received user expression (step 206). Extracted entities may include persons, things, locations, organizations, products, etc. and may be extracted using techniques such as named entity recognition. In embodiments, the extracted entities may be detailed in the intent databases 132 and be associated with data such as one or more classes, one or more class inputs/outputs, one or more resolvers, etc. In embodiments, entities may be classified or categorized via methods such as entity classification, named entity recognition, etc., and the intent determiner 134 may extract and classify all entities identified within the user expression. In embodiments, the intent determiner 134 may break down the user expression into segments known as frames. In embodiments, frames may be used to separate multiple intents found within an expression and may be delineated via means such as semantic parse trees, natural language processing, etc. In such embodiments, the intent determiner 134 may extract one or more entities from each frame identified within the user expression and associate the extracted entities with the respective frames from which they were extracted.

With reference again to the previously introduced example depicted by FIGS. 3-4 and describing the intent determiner 134 receiving the expression, "Which over the counter medications help manage the side effects of COPD medications?", the intent determiner 134 extracts and classifies the entity COPD [condition].

The intent determiner 134 may gather one or more resolvers associated with the extracted entities and/or the classifications of the extracted entities (step 208). In exemplary embodiments, resolvers may be functions that correlate entities and/or classes to user expression, such as statements, questions, etc., for example those depicted by Table 1. In embodiments, the intent determiner 134 identifies resolvers associated with the extracted entities by referencing the one or more entities and their associated resolvers within the intent databases 132. In embodiments, one or more resolvers may be associated with a particular entity or class, and the intent determiner 134 may be configured to gather all resolvers associated with the entity or class for filtering to the appropriate resolver in the proceeding steps. In embodiments in which the intent determiner 134 have segmented the user expression into frames, the intent determiner 134 may gather the one or more resolvers associated with the extracted entities as in above, however do so per identified frame.

With reference again to the previously introduced example depicted by FIG. 3-4 where the intent determiner 134 extracts the entity COPD [condition] from the user expression, the intent determiner 134 gathers the resolver "getConditionMeds" having input class [condition] and output class [medication], and resolver "getConditionSymptoms" with input class [condition] and output class [symptoms].

The intent determiner 134 may extract and satisfy one or more appropriate first tier resolvers and/or intents from the one or more gathered resolvers (step 210). In embodiments, the intent determiner 134 may extract one or more appropriate first tier resolvers by analyzing a similarity of the collected or received user expression, or frame thereof, with training expressions associated with the gathered resolvers and/or intents (see Table 1, for reference). In embodiments, the natural language training expressions associated with the gathered resolvers may be detailed in the intent databases 132. In embodiments, the intent determiner 134 may determine a similarity between the user expression and resolver training expressions using various methods. For example, the intent determiner 134 may determine a similarity between the user expression and resolver training expressions based on a bag of words model. Bag of words models determine the numbers of words within a sentence without regard to syntax or grammar. For example, the intent determiner 134 may determine a similarity between the user expression and resolver training expressions using a bag of words model where the distribution of words in a user expression is analyzed as a bar graph with words on the x-axis and numbers of occurrence on the y-axis. The intent determiner 134 may determine that a user expression bar graph that is more similar to a resolver training expression's bar graph has a higher similarity score than a user expression bar graph that is less similar to the resolver training expression's bar graph. Additionally, cosine similarity may determine a similarity between a user expression and resolver training expressions by modeling both the user expression and resolver training expressions as vectors and determining cosine values between them. In such embodiments, a resolver training expression and user expression with a higher cosine value between them may be treated as having a higher similarity score than a different resolver training expression with the same user expression having a lower cosine value between them. The intent determiner 134 may also determine similarity scores using word mover's distance by determining the sum of distances between individual words in a user expression and resolver training expressions.

In reviewing the similarity scores, the intent determiner 134 may treat smaller sums as indicative of higher similarity scores and larger sums as indicative of lower similarity scores (or vice versa) (step 210 continued). The intent determiner 134 may then determine a resolver confidence score that the user expression matches a resolver training expression based on the one or more similarity scores. In embodiments, the intent determiner 134 may rely on a single of the above or other techniques to determine a resolver confidence score. For example, the intent determiner 134 may determine a resolver confidence score by the similarity calculated by the bag of words model. In embodiments, the method may be selected based on, for example, accuracy. In other embodiments, the intent determiner 134 may consider two or more of the aforementioned or other techniques for determining a resolver confidence score that the user expression matches a resolver training expression. For example, the intent determiner 134 may average the similarity scores from the bag of words and cosine distance processing to determine the resolver confidence score. In further embodiments, the individual techniques may be weighted and the intent determiner 134 may determine a resolver confidence score based on a summed weight of the two or more techniques. Moreover, in embodiments, such weightings may be determined through use of a model, such as one generated through machine learning techniques. The intent determiner 134 may extract the resolver and/or intent with a highest or lowest resolver confidence score. In other embodiments, the intent determiner 134 may be configured alternatively.

The intent determiner 134 may satisfy the appropriate first tier resolver and/or intent (step 210 continued). In embodiments, the intent determiner 134 may satisfy the appropriate first tier resolver by answering the resolver and/or intent or determining the output of the resolver and/or intent via reference to the user expression or an external resource such as a corpus or question and answer service. In some embodiments, the intent resolver 134 may check to make sure all the previously received intent resolvers can properly act upon the received user expression. In some embodiments, the intent resolver 134 may determine the dependency of the received resolvers based on their input and output classes before or without satisfying the resolvers.

With reference again to the previously introduced example depicted by FIG. 3-4 where the intent determiner 134 gathers resolvers "getConditionMeds" with input class [condition] and output class [medication], and "getConditionSymptoms" with input class [condition] and output class [symptoms], the intent determiner 134 uses a cosine similarity model to compare the collected user expression "Which over the counter medications help manage the side effects of COPD medications?" to the training sentence for resolver "getConditionMeds": "What medications are [condition] medications?" and to the training sentence for resolver "getConditionSymptoms": "What are the symptoms of [medication]?" to determine that "getConditionMeds" has resolver confidence score 89 and "getConditionSymptoms" has resolver confidence score 27. The intent determiner 134 extracts resolver "getConditionMeds" because of the higher confidence score and satisfies it by determining its output from an external resource: Ipratropium and Budesonide.

The intent determiner 134 may extract and satisfy an additional resolver based on the output of the previously identified and satisfied first tier resolver and/or intent (step 212). The intent determiner 134 may compare the output of the previously extracted first tier resolver with the inputs of other resolvers in the intent databases 132. If the output of the first tier resolver satisfies the input of one or more additional resolvers, the intent determiner 134 may extract the appropriate resolver using techniques described in step 210, and then satisfy the additional appropriate resolver. In further iterations, the inputs of additional resolvers are compared to the output of the preceding satisfied resolver.

With reference to the previously introduced example illustrated by FIG. 3-4, where the intent determiner 134 satisfies resolver getConditionMeds and determines the resolver's output: Ipratropium and Budesonide, the intent determiner 134 extracts resolver getMedSideEffects as having input satisfied by the output of getConditionMeds ([medication]=Ipratropium and Budesonide) and being the appropriate resolver. The intent determiner 134 satisfies resolver getMedSideEffects with outputs: Bronchitis, Nausea, Fatigue, and Headache.

The intent determiner 134 may determine whether there are additional resolvers (decision 214). In the event that the intent determiner 134 determines that there are additional resolvers (decision 214 "YES" branch), the intent determiner 134 may extract and satisfy an additional resolver (step 212). The intent determiner 134 may further iterate decision 214 until the intent determiner 134 determines that there are no additional resolvers with inputs satisfied by the outputs of previously identified resolvers. In the event that the intent determiner 134 determines that there are no additional resolvers with input satisfied (decision 214 "NO" branch), the intent determiner 134 may cease to extract and satisfy resolvers. In embodiments, upon determining that there are no additional resolvers, the intent determiner 134 may output, export, display, etc. the dependency and/or order of the extracted and/or satisfied resolvers. For example, the intent determiner 134 may export the received resolvers in the form of a list or parse tree that shows the dependency of a received resolver and/or intent on the output of another extracted resolver and/or intent. In embodiments, the intent determiner 134 may further store the processed user expression and associated intents for future processing.

With reference to the previously introduced example illustrated by FIG. 3-4, where the intent determiner 134 satisfies resolver getMedSideEffects with outputs: Bronchitis, Nausea, Fatigue, and Headache, the intent determiner 134 extracts the additional resolver getSideEffectOTCMeds with input satisfied by the output of getMedSideEffects ([side_effect]=Bronchitis, Nausea, Fatigue and Headache). The intent determiner 134 satisfies resolver getSideEffectOTCMeds with outputs: Aspirin, Acetaminophen, Ibuprofen, Kaopectate, Pepto-Bismol, Dramamine, Vivarin, NoDoz, and Naproxen. The intent determiner 134 exports the dependency of the resolvers and their outputs in a dependency graph as illustrated in FIG. 4.

FIG. 3 depicts an illustrative example of the intent determination system 100 resolving a user expression, in accordance with the exemplary embodiments.

FIG. 4 depicts an illustrative example of an intent resolver dependency graph generated by the intent determination system 100 in resolving the user expression of FIG. 3, in accordance with the exemplary embodiments.

Figure 5:
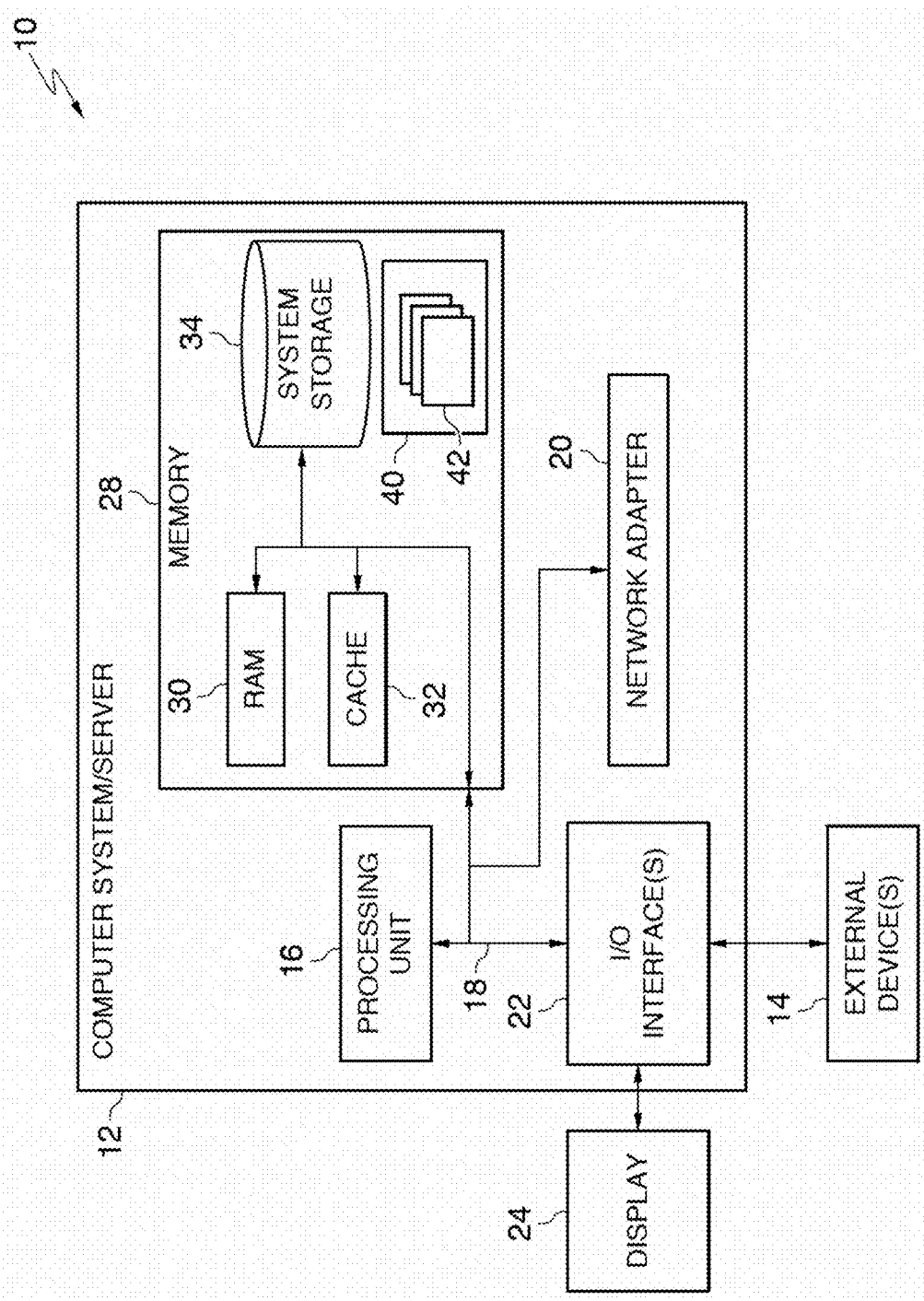
FIG. 5 depicts an exemplary block diagram depicting the hardware components of the intent determination system 100 of FIG. 1, in accordance with the exemplary embodiments.

FIG. 5 depicts a block diagram of devices within the intent determiner 134 of the intent determination system 100 of FIG. 1, in accordance with the exemplary embodiments. It should be appreciated that FIG. 5 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are determined based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
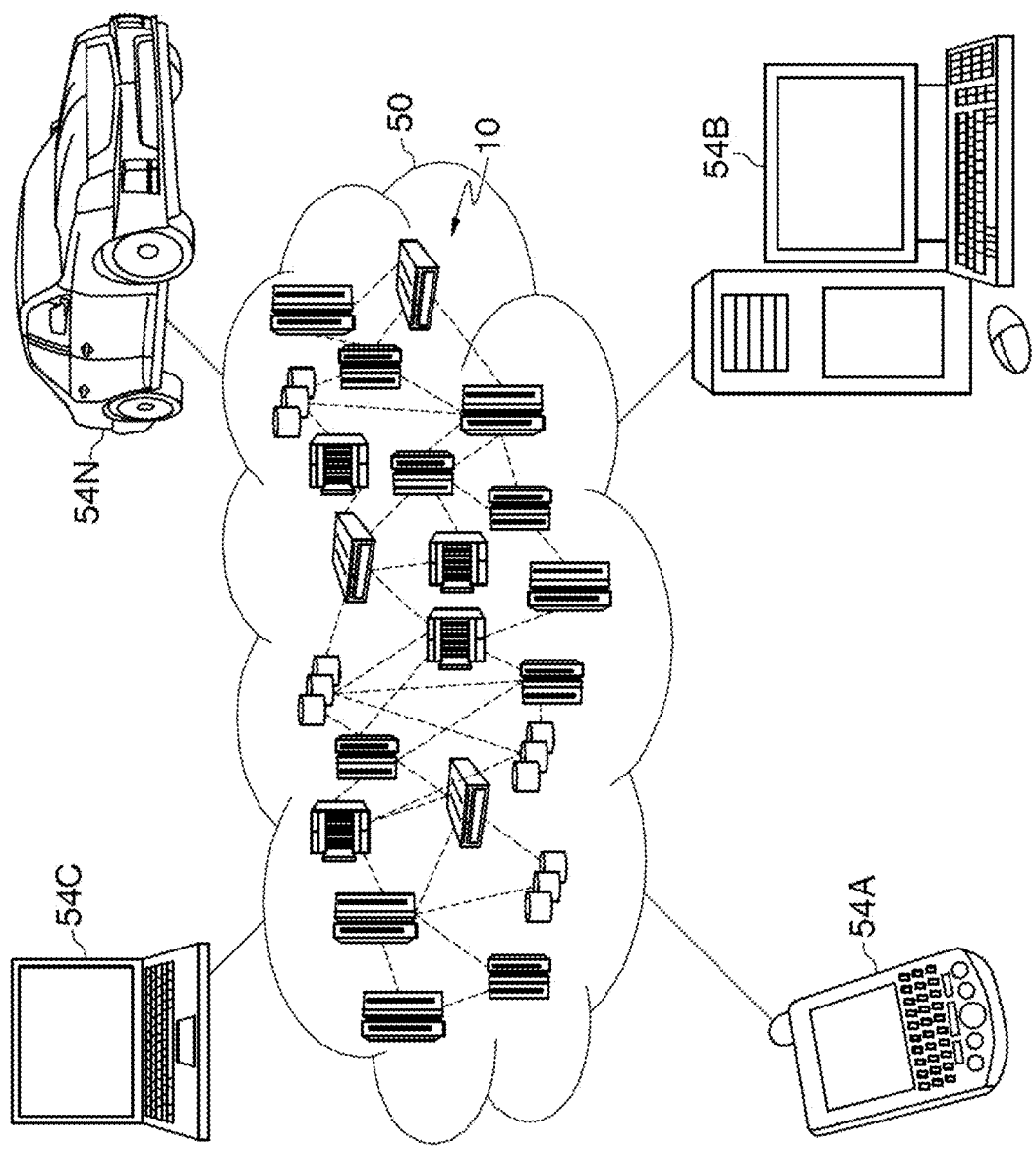
FIG. 6 depicts a cloud computing environment, in accordance with the exemplary embodiments.

Referring now to FIG. 6, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 40 and cloud computing environment 50 can communicate with any type of computerized device over any type of network and/or network addressable connection (e.g., using a web browser).

Figure 7:
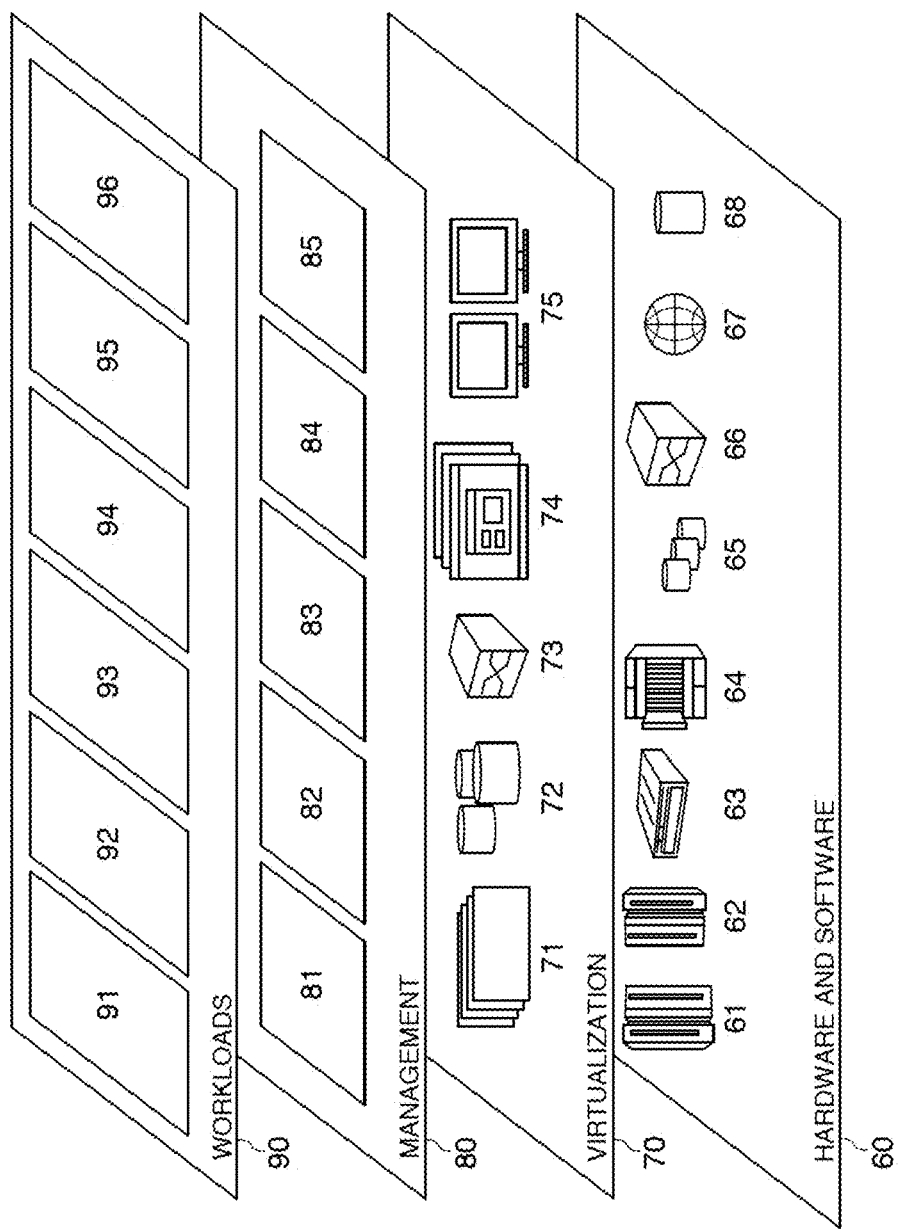
FIG. 7 depicts abstraction model layers, in accordance with the exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intent determination 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for determining intents, the method comprising:
   receiving a user expression;
   extracting one or more entities from one or more frames of the user expression;
   gathering one or more resolvers associated with the one or more entities, wherein the one or more resolvers are each associated with an intent and one or more training expressions of one or more intents associated with the one or more entities, wherein a dependency of the one or more resolvers is determined based on an input and an output class before satisfying the one or more resolvers;
   identifying a first resolver of the one or more resolvers based on the user expression and the one or more training expressions; and
   resolving the first resolver to generate a first output.

2. The method of claim 1, further comprising:
   identifying a second resolver of the one or more resolvers associated with the one or more entities;
   determining whether the first output is an input to the second resolver; and
   based on determining that the first output is an input to the second resolver, resolving the second resolver to generate a second output.

3. The method of claim 1, wherein identifying the first resolver of the one or more resolvers is based on determining a similarity score between the user expression and the one or more training expressions.

4. The method of claim 3, wherein the similarity score is determined via one or more models from the group comprising a bag of words model, a cosine similarity model, and a word mover's distance model.

5. The method of claim 1, further comprising:
   segmenting the user expression based on the one or more frames; and
   wherein extracting the one or more entities from the user expression is performed for each of the one or more frames, and wherein the user expression and extracted one or more entities are associated with the respective frames from which they were extracted, and the one or more resolvers associated with the extracted one or more entities are associated with the respective frames.

6. The method of claim 5, wherein the one or more frames are segmented based on a semantic parse tree.

7. The method of claim 2, further comprising:
   displaying at least one of the first resolver, the first output, the second resolver, and the second output in at least the form of a list or parse tree.

8. A computer program product for determining intents, the computer program product comprising:
   one or more non-transitory computer-readable storage media and program instructions stored on the one or more non-transitory computer-readable storage media capable of performing a method, the method comprising:
   receiving a user expression;
   extracting one or more entities from one or more frames of the user expression;
   gathering one or more resolvers associated with the one or more entities, wherein the one or more resolvers are each associated with an intent and one or more training expressions of one or more intents associated with the one or more entities, wherein a dependency of the one or more resolvers is determined based on an input and an output class before satisfying the one or more resolvers;
   identifying a first resolver of the one or more resolvers based on the user expression and the one or more training expressions; and
   resolving the first resolver to generate a first output.

9. The computer program product of claim 8, further comprising:
   identifying a second resolver of the one or more resolvers associated with the one or more entities;
   determining whether the first output is an input to the second resolver; and
   based on determining that the first output is an input to the second resolver, resolving the second resolver to generate a second output.

10. The computer program product of claim 8, wherein identifying the first resolver of the one or more resolvers is based on determining a similarity score between the user expression and the one or more training expressions.

11. The computer program product of claim 10, wherein the similarity score is determined via one or more models from the group comprising a bag of words model, a cosine similarity model, and a word mover's distance model.

12. The computer program product of claim 8, further comprising:
   segmenting the user expression based on the one or more frames; and
   wherein extracting the one or more entities from the user expression is performed for each of the one or more frames, and wherein the user expression and extracted one or more entities are associated with the respective frames from which they were extracted, and the one or more resolvers associated with the extracted one or more entities are associated with the respective frames.

13. The computer program product of claim 12, wherein the one or more frames are segmented based on a semantic parse tree.

14. The computer program product of claim 9, further comprising:
   displaying at least one of the first resolver, the first output, the second resolver, and the second output in at least the form of a list or parse tree.

15. A computer system for determining intents, the computer system comprising:

one or more computer processors, one or more computer-readable storage media, and program instructions stored on the one or more of the computer-readable storage media for execution by at least one of the one or more processors capable of performing a method, the method comprising:

receiving a user expression;

extracting one or more entities from one or more frames of the user expression;

gathering one or more resolvers associated with the one or more entities, wherein the one or more resolvers are each associated with an intent and one or more training expressions of one or more intents associated with the one or more entities, wherein a dependency of the one or more resolvers is determined based on an input and an output class before satisfying the one or more resolvers;

identifying a first resolver of the one or more resolvers based on the user expression and the one or more training expressions; and resolving the first resolver to generate a first output.

16. The computer system of claim 15, further comprising:

identifying a second resolver of the one or more resolvers associated with the one or more entities;

determining whether the first output is an input to the second resolver; and based on determining that the first output is an input to the second resolver, resolving the second resolver to generate a second output.

17. The computer system of claim 15, wherein identifying the first resolver of the one or more resolvers is based on determining a similarity score between the user expression and the one or more training expressions.

18. The computer system of claim 17, wherein the similarity score is determined via one or more models from the group comprising a bag of words model, a cosine similarity model, and a word mover's distance model.

19. The computer system of claim 15, further comprising:

segmenting the user expression based on the one or more frames; and wherein extracting the one or more entities from the user expression is performed for each of the one or more frames, and wherein the user expression and extracted one or more entities are associated with the respective frames from which they were extracted, and the one or more resolvers associated with the extracted one or more entities are associated with the respective frames.

20. The computer system of claim 19, wherein the one or more frames are segmented based on a semantic parse tree.

* * * * *